United States Patent [19]
Upmeier

[11] 3,804,571
[45] Apr. 16, 1974

[54] APPARATUS FOR MAKING, FLATTENING AND HAULING OFF BLOWN TUBULAR PLASTICS FILM

[75] Inventor: Hartmut Upmeier, Tecklenburg, Germany

[73] Assignee: Windmoller & Holscher, Lengerich of Westphalia, Germany

[22] Filed: Aug. 17, 1971

[21] Appl. No.: 172,520

[30] Foreign Application Priority Data
Aug. 19, 1970 Germany............................ 2041104
Nov. 16, 1970 Germany............................ 2056292

[52] U.S. Cl.................. 425/326, 425/327, 425/328, 425/326 B, 425/455
[51] Int. Cl.............................................. B29f 3/00
[58] Field of Search........ 425/327, 326, 455, 326 B, 425/387, 328

[56] References Cited
UNITED STATES PATENTS

| | | | |
|---|---|---|---|
| 2,337,927 | 12/1943 | Reichel et al................... | 425/326 X |
| 3,161,942 | 12/1964 | Cheney.......................... | 425/455 X |
| 3,337,665 | 8/1967 | Underwood et al............ | 425/387 X |
| 3,456,044 | 7/1969 | Pahlke........................... | 425/326 X |
| 3,466,356 | 9/1969 | Carlson, Jr. et al.............. | 264/95 |
| 3,008,186 | 11/1961 | Voigt.............................. | 425/326 |

*Primary Examiner*—Richard B. Lazarus
*Attorney, Agent, or Firm*—Fleit, Gipple & Jacobson

[57] ABSTRACT

An apparatus for making, flattening and hauling off blown tubular plastics film is disclosed which comprises an extruder for producing the film, a vertically upwardly operative blowhead for inflating the film with air, first means for provisionally flattening the film provided vertically above the blowhead downstream of a position at which the film has solidified. Direction changing means including two direction changing rolls are arranged for diverting the film through 180°. The direction changing rolls are grooved to permit the passage of inflating air from the blowhead to the squeeze rolls. Supporting means are provided between the two direction changing rolls for limiting inflation of the film. Second means for flattening the film, including squeeze rolls, are disposed at a spacing from and vertically below the downstream end of the direction changing means.

3 Claims, 1 Drawing Figure

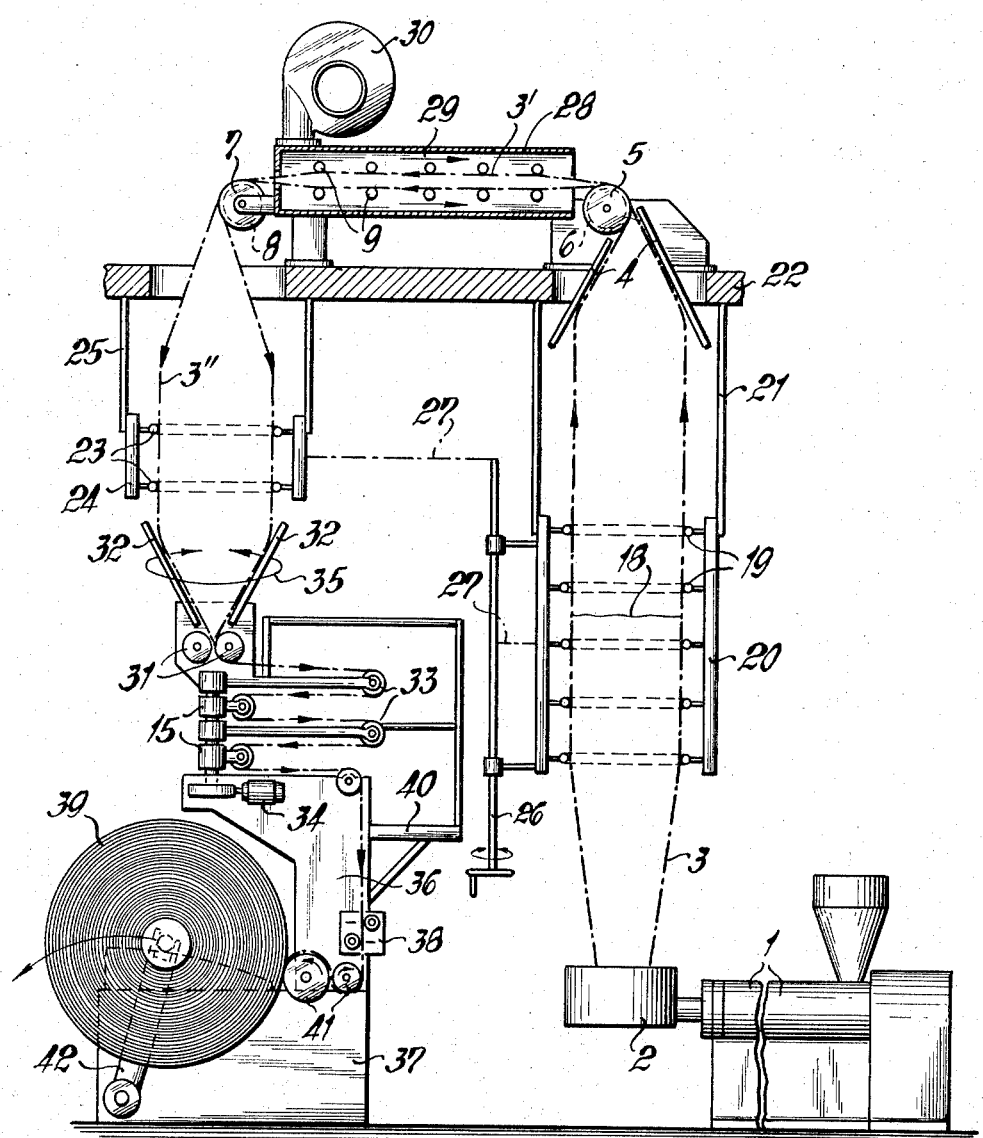

APPARATUS FOR MAKING, FLATTENING AND HAULING OFF BLOWN TUBULAR PLASTICS FILM

The invention relates to an apparatus for making, flattening and hauling off blown tubular plastics film.

For the purpose of high-speed production of extruded tubular plastics film by means of a blowing process which inflates the film as a bubble, it is conventional to employ a vertically upwardly operative blowhead. This is because the bubble of film adjacent the blowhead is still in a plastic state and would become deformed under gravitational forces if it were to be guided horizontally, whilst a downwardly operative blowhead is impractical because the weight of the film would cause the bubble to tear off at the nozzle orifice of the blowhead.

Between the blowhead and flattening and squeezing equipment for the film bubble downstream of the blowhead there must be provision for an adequately long cooling path, this path being particularly long in the case of high-capacity apparatus where the haul-off speed is correspondingly high. Accordingly, since inflating air for the film bubble must be blown vertically upwards, the factory housing the apparatus must be very high even if the flattening and haul-off and any subsequent equipment were to take up no height at all.

The invention aims to provide an apparatus which, although employing a vertically upwardly operative blowhead, permits the height of the factory to be reduced or, for a given factory height, permits the cooling path to be extended so as to increase the maximum haul-off speed.

According to the invention, there is provided an apparatus for making, flattening and hauling off blown tubular plastics film, comprising an extruder for producing the film, a vertically upwardly operative blowhead for inflating the film with air, first flattening means for the film provided vertically above the blowhead downstream of a position at which the film has solidified, direction changing means including a direction changing roll or rolls for diverting the film through 180°, the said direction changing roll or rolls being grooved to permit the passage of inflating air from the blowhead, and second flattening means for the film, including squeeze rolls, disposed at a spacing from and vertically below the downstream end of the direction changing means.

By means of the invention, a film bubble is formed upstream and downstream of the direction changing means because the inflating air can pass from the blowhead through the grooves in the direction changing roll or rolls up to the position of the squeeze rolls of the second flattening means. The distance between the first flattening means and the second flattening means is therefore also available as a cooling path. It is this which permits the desired reduction to be obtained in the height of the factory.

Preferably, the direction changing means comprise two direction rolls at a spacing from one another and supporting cylinders located therebetween for limiting inflation of the film. For the purpose of more intensive cooling at the position of the direction changing means, the supporting cylinders may be water-cooled but flat cooling plates or gratings may be used instead. It is also possible to provide a cooling jacket at the location of the direction changing means for surrounding the film and cooling same with air flowing in counter current to the direction of film feed.

The invention is particularly applicable to apparatus in which the flattening and haul-off means are given a continuous or oscillating rotary motion about the longitudinal axis of the film for the purpose of distributing unavoidable longitudinally extending errors in the thickness of the film. If there were no relative rotary movement between the blowhead on the one hand and the flattening and haul-off means on the other hand, then fluctuations in thickness extending over the entire width of the film would be additive when the film is later coiled, this giving rise to bumps in the coil and permanent deformation of the convolutions of film forming the coil. The continuous or oscillating rotary movement has the effect of distributing the errors in thickness over the entire width of the coil in much the same way as a rope is wound on a drum, thereby avoiding the formation of bumps or annular beads on the coil.

To effect the required relative rotation between the blowhead and the haul-off means, it is possible to rotate the blowhead. This, however, is effective to distribute only errors in thickness produced by the blowhead itself — not the errors that may be caused through other influences, for example in the extruder itself or by one-sided cooling of the film bubble. Another way of obtaining relative rotation is to oscillate flattening plates and squeeze rolls of the flattening means.

It has already been suggested to provide reversibly rotary flattening and haul-off means vertically above the blowhead of an apparatus, followed by a system of turning bars which feed the flattened tubular film to a stationary coiler, the coiler in that case also being mounted on the factory floor. The system of turning bars is mounted on the reversibly rotary haul-off means and has the effect of considerably increasing the already high path for the film required for high capacity apparatus. Also, it has not hitherto been possible to dispense with edge control for forming exact coils because the large interval between the reversibly rotatable haul-off and the coil provides ample opportunity for the film to wander laterally, prompted by the laterally to and from movement of thicker film portions. This was particularly disadvantageous in cases where the tubular film is slit at the sides and coild as two flat films on a double winder. The invention makes it possible also to avoid these disadvantages in an apparatus using a system of turning bars. More particularly, the second flattening means are mounted for oscillatory rotary motion, and stationary haul-off and coiling means for the film are provided downstream of the second flattening means at substantially the same elevation as the extruder, the haul-off and coiling means receiving the film from the system of turning bars. A reduction in height is brought about by the fact that the film is diverted through 180° by the direction changing means between the first and second flattening means. Since the reversible second flattening means can be mounted on the frame of the coiler itself, but the system of turning bars being located between the second flattening means and the coiler as viewed in the direction of travel of the film, it is no longer possible for the film to wander sideways and of course there is the advantage of being able to mount the coiler on the factory floor. It is advantageous to couple the rotary speed of the second flattening means to the haul-off speed. A stationary pair of haul-off rolls may be provided downstream of the turning bar system and the squeeze rolls, which are preferably not positively driven, are provided upstream of the system of turning bars, one of the haul-off rolls being in contact with a reel for the film so as to turn the reel, thereby dispensing with a special rotary drive for the reel.

Means may be provided as described in one of our earlier patent applications for supporting, calibrating and cooling the inflated film, each such means comprising ring segments around the film which seqments are radially adjustable for adapting to different desired film diamters. Guiding the film in this way during its vertically downward path until just before it reaches the rotary flattening means has the particular advantage of being able to coil the film without inadvertent lateral displacement on the reel, thereby dispensing with means for controlling the edges of the film. The ring segments of the two supporting, calibrating and cooling means are preferably radially adjustable in unison.

An example of the invention will now be described with reference to the accompanying drawing.

A screw extruder 1 equipped with a blowhead 2 forms tubular plastic film in the form of an upwardly directed bubble 3. After the bubble 3 has been cooled (by means which are not illustrated), it is flattened by stationary plates 4 and the film is diverted by direction changing means comprising a first direction changing roll 5 provided with grooves 6 and a second direction changing roll 7 provided with grooves 8, the film thereafter being fed vertically downwardly, i.e., in a direction parallel and opposite to the direction in which it leaves the blowhead 2. The grooves 6, 8 in the direction changing rolls enable the air from the blowhead to inflate the portion 3′ of film between the direction changing rolls and to inflate the film to a second bubble 3″ downstream of the direction changing means. Auxiliary cylinders 9 limit the degree of inflation between the direction changing rolls 5, 7. These cylinders may also be employed as additional cooling means if they are water-cooled. Alternatively, flat cooling plates or gratings may be used.

The bubble 3″ of film is flattened by reversibly rotatable second flattening means comprising flattening plates 32 and squeeze rolls 31 and then passes over a system of turning bars 33 which swing out laterally somewhat like a fan. Reversible rotation through 360° for the flattening plates 32 and squeeze rolls 31 is brought about by a motor 34 and takes place in the direction of the arrows 35, the individual direction changing shafts of the turning bar system about which the film is passed being oscillatingly rotated in unison with the flattening means but to an ever decreasing extent as the film moves further away from the flattening means. The particular construction of the turning bar system is the subject of one of our previous patent applications.

The reversingly rotatable flattening plates, squeeze rolls and turning bar system are carried by a frame 36 which is supported on a coiling device 37 and which may also be used for accommodating a printing station 38 for the film and/or slitting means for slitting the flattened tubular film before winding it on a double winder. The coils 39 of film may have very large diameters of 1.5 to 2 metres and therefore the flattening means and turning bar system will be at some elevation from floor level. Accordingly, a small platform or catwalk 40 may be provided for maintenance personnel.

Positively driven haul-off rolls 41 are provided downstream of the turning bar system. One of these haul-off rolls is in contact with the film that is being coiled on the reel 39 so that it is also effective to turn the reel and a separate drive for the reel can be dispensed with. It is, however, required that the turning bar system will not cause the length of film between the blowhead and the reel to vary periodically. This requirement can be met by employing the turning bar system described in our aforementioned previous patent application.

To simplify reel replacement, the full coil is preferably deposited on the floor or in a vehicle with the aid of hydraulically braked arms 42.

The film bubble 3 is guided by calibrating means and the bubble 3″ by cooling means, both these means forming the subject of previous patent applications in our name. The calibrating means are disposed at the location indicated by the line 18 where the plastics film solidifies and comprise supporting ring segments 19 which are provided with a readily rotatable covering and which are adjustable in diameter in much the same way as the iris diaphragm of a camera. The segments 19 are carried by a frame 20 which is suspended by members 21 from an elevated platform 22 on which the direction changing means are also mounted. The cooling means for the bubble 3″ are similar in construction to the calibrating means but in this case the supporting ring segments are replaced by water-cooled pipe segments 23 for cooling the film. The pipe segments 23 are disposed above the flattening means 31–35 and coaxially therewith so that the flattened film will not be displaced laterally. The segments 23 are mounted in a frame 24 which is suspended by members 25 from the platform 22.

The operation of the apparatus can be made particularly simple if the segments 19 and 23 of the calibrating and cooling means, respectively, are radially adjustable in unison to conform in diameter to a particular diameter of film that is to be made. Such simultaneous adjustment is diagrammatically indicated in the drawing by an adjusting shaft 26 which is connected at 27 to the calibrating and cooling means.

As evident from the drawing the flat bubble 3′ of film confined between the cylinders 9 between the direction changing rolls 5 and 7 is surrounded by a cooling jacket 28 through which cooling air is forced by a fan 30 preferably in a direction of the arrows 29, namely in counter current to the feeding direction of the film.

I claim:

1. An apparatus for making, flattening and hauling off blown tubular plastics film comprising an extruder for extruding said film; a blowhead for inflating said film with air in a vertically and upwardly oriented direction, first means positioned vertically above said blowhead and downstream of a position at which said film is solidified for flattening said film, direction changing means including two direction changing rolls for diverting said film through 180°, second means spaced from and positioned vertically below the downstream end of said direction changing means for flattening said film, said second means including squeeze rolls, said direction changing rolls being grooved to permit the passage of inflating air from said blowhead to said squeeze rolls such that said film is inflated with air between said two direction changing rolls and between said direction changing means and said second means, a supporting means arranged between said two direction changing rolls for limiting the inflation of said film; another supporting means positioned upstream of each of said first and second means comprising ring segments surrounding said film and further comprising means for radially adjusting said ring segments for adapting said supporting means to different film diameters, and means for radially adjusting said ring segments in unison.

2. The apparatus of claim 1 in which said segment means is mounted for oscillatory rotary motion and further comprising stationary haul off and coiling means for said film downstream of said second means at substantially the same level as said extruder and further comprising a turning bar system mounted for oscillatory rotary motion, said haul off and coiling means adapted to receive said film from said turning bar system.

3. The apparatus of claim 2 in which said stationary haul off and coiling means comprises a pair of stationary haul off rolls located downstream of said turning bar system and in which said squeeze rolls are located upstream of said turning bar system, one of said haul off rolls being in contact with said coiling means for driving said coiling means.

* * * * *